US012183979B2

(12) United States Patent
Rudant et al.

(10) Patent No.: US 12,183,979 B2
(45) Date of Patent: Dec. 31, 2024

(54) RADIOFREQUENCY PLANAR ANTENNA WITH CIRCULAR POLARISATION

(71) Applicant: Commissariat à l'énergie atomique et aux énergies alternatives, Paris (FR)

(72) Inventors: Lionel Rudant, Grenoble (FR); Lotfi Batel, Grenoble (FR); Christophe Delaveaud, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 169 days.

(21) Appl. No.: 18/067,849

(22) Filed: Dec. 19, 2022

(65) Prior Publication Data

US 2023/0198163 A1 Jun. 22, 2023

(30) Foreign Application Priority Data

Dec. 21, 2021 (FR) ..................................... 21 14072

(51) Int. Cl.
*H01Q 21/06* (2006.01)
*H01Q 1/24* (2006.01)

(52) U.S. Cl.
CPC ........... *H01Q 21/062* (2013.01); *H01Q 1/247* (2013.01)

(58) Field of Classification Search
None
See application file for complete search history.

(56) References Cited

U.S. PATENT DOCUMENTS 6,414,647 B1 * 7/2002 Lee .......................... H01Q 9/28 343/792
2005/0195124 A1 * 9/2005 Puente Baliarda .. H01Q 9/0414 343/893
2015/0054688 A1 2/2015 Belmkaddem et al.
2018/0269936 A1 * 9/2018 Chen ...................... H04Q 11/06

FOREIGN PATENT DOCUMENTS

| | | |
|---|---|---|
| CN | 109149094 A | 1/2019 |
| EP | 2 840 654 B1 | 6/2020 |
| JP | 2000-341035 A | 12/2000 |

OTHER PUBLICATIONS

French Preliminary Search Report issued Aug. 3, 2022 in French Application 21 14072, filed on Dec. 21, 2021 (with English Translation of Categories of cited documents), 3 pages.
Ge, L. "A Magneto-Electric Dipole Antenna with Tunable H-plane Beamwidth" IEEE International Conference on Computational Electromagnetics (Feb. 23, 2016) (3 pages).

* cited by examiner

*Primary Examiner* — Jany Richardson
(74) *Attorney, Agent, or Firm* — Oblon, McClelland, Maier & Neustadt, L.L.P.

(57) ABSTRACT

The present invention relates to a radio frequency antenna (10) including an antenna array (12) operating at one wavelength and comprising:

a powered dipole (14A) connected at an access point (15) to a radio frequency transmitter generating or receiving a wave at the wavelength, at least one coupled dipole (14C1, 14C2, 14C3) connected at an access point to a respective load (Z1, Z2, Z3), the powered dipole (14A) and each coupled dipole (14C1, 14C2, 14C3) including two strands extending from the access point (15), the access points (15) being arranged so as to form a polygon, the first strand of a dipole (14)

(Continued)

extending along the second strand of a neighboring dipole (14) at a distance less than one tenth of the wavelength.

12 Claims, 10 Drawing Sheets

RADIOFREQUENCY PLANAR ANTENNA WITH CIRCULAR POLARISATION

This patent application claims the benefit of document FR 21/14072 filed on Dec. 21, 2021, which is hereby incorporated by reference.

The present invention relates to a radio frequency antenna. The present invention further relates to a system including such a radio frequency antenna.

The technical field is that of radio frequency antennas, and more specifically circularly polarized antennas.

Circularly polarized radio frequency waves are used in particular, in satellite communications insofar as circular polarization makes it possible not to depend on the orientation alignment between the satellite and the receiver.

As an example of a particular application, the case of the GPS system can be cited. "GPS" is the acronym of "Global Positioning System". Such a system operates with circularly polarized waves the frequencies of which are either 1225 MHz or 1575 MHz.

According to another example of application, for constellations of microsatellites in low orbit, communications are made using circularly polarized waves the frequencies of which are either 400 MHz or 868 MHz.

A plurality of antenna systems for obtaining circularly polarized waves have been developed.

So-called microstrip antennas are known antennas associated with dual excitation circuits for obtaining circular polarization by combining the two orthogonal modes. In some embodiments, a plurality of superimposed patches is used for obtaining a plurality of operating frequency bands.

Other antenna systems use quadrifilar helical antennas associated with quadruple excitation circuits.

There are also crossed dipoles associated with double excitation circuits. In some particular cases, to facilitate integration, the radiating elements used are miniaturized.

In each case, circularly polarized antennas consist of a plurality of radiating elements associated with a specific excitation circuit. The excitation circuit makes it possible to establish amplitude and phase weighted excitations of the different radiating elements.

However, antennas produced in this way have a relatively large overall size.

There is thus a need for an antenna apt to emit circularly polarized radio frequency waves and which has a reduced bulk.

To this end, the description describes a radio frequency antenna comprising at least one antenna array operating at an operating frequency, each antenna array comprising a powered dipole, the powered dipole being connected at an access point, to a radio frequency transmitter suitable for generating or receiving a wave at the operating frequency. Each antenna array further comprises at least one coupled dipole, each coupled dipole being connected at an access point to a respective resistive and/or capacitive and/or inductive load. The powered dipole and each coupled dipole comprise two strands, the strands extending from the access point, the access points being arranged so as to form a polygon, the first strand of a dipole extending along the second strand of a neighboring dipole on said polygon at a distance less than or equal to one tenth of the wavelength corresponding to the operating frequency, said wavelength being called operating length.

According to other particular embodiments, the antenna has one or a plurality of the following features, taken individually or according to all technically possible combinations:

- both strands have a length less than or equal to a quarter of the operating wavelength.
- the first strand of a dipole extends along the second strand of a neighboring dipole on said polygon at a distance less than or equal to one twentieth of the operating wavelength.
- a direction being defined for each strand, the directions of the two strands have an angle therebetween equal to 90° to within plus or minus 10%, the powered dipole and each coupled dipole being arranged so that each direction of one strand intersects with a direction of another strand.
- the polygon is a regular polygon.
- the number of coupled dipoles of an antenna array is comprised between 2 and 4.
- the radio frequency antenna includes two antenna arrays, the polygon formed by the access points of the second antenna array being included in the internal space delimited by the polygon formed by the access points of the first antenna array, each antenna array operating at a respective operating frequency.
- the radio frequency antenna has a reflector plane located at a distance less than or equal to one quarter of the operating wavelength.
- the strands have meanders or folds.
- the loads of the coupled dipoles are chosen so that:
  - the radiation from the radio frequency antenna has a right circular polarization with a maximum gain along the direction perpendicular to the radio frequency antenna,
  - the radiation from the radio frequency antenna has a uniform right circular polarization for an elevation aperture between 90° and −90° around the direction perpendicular to the radio frequency antenna, and
  - the gain of the cross polarization is minimized.

The description further relates to a system, in particular a satellite positioning system, including at least one radio frequency antenna as described above.

The features and advantages of the invention will appear upon reading the following description, given only as an example, but not limited to, and making reference to the enclosed drawings, wherein:

FIG. 1 is a schematic representation of an example of an antenna,

FIG. 2 is a schematic representation of a perspective view of the antenna shown in FIG. 1, FIGS. 3 and 4 are simulation graphs showing the performance obtained with the antenna shown in FIG. 1, FIG. 5 is a schematic representation of another example of an antenna, FIGS. 6 to 8 are simulation graphs showing the performances obtained with the antenna shown in FIG. 5, FIG. 9 is a simplified representation of examples of antenna arrangement, and FIG. 10 is a simplified representation of other examples of antenna arrangement Before describing in a general way, the antenna forming the subject matter of the present invention, the present description is concerned with describing two particular examples.

The two particular examples are applied to the case of a GPS system.

The first example relates to the band L1 and the second to a double band L1/L2.

The frequency band L1 is a relatively narrow band around the central frequency of 1575 MHz. In such context, the term "narrow" means a frequency extension on the order of less than 5% of the central frequency.

Similarly, the frequency band L2 is a relatively narrow band around the central frequency of 1225 MHz.

EXAMPLE 1: ANTENNA FOR THE BAND L1

A radio frequency antenna 10 is illustrated schematically in FIG. 1.

The antenna 10 is suitable for operating at a central operating frequency $f_0$. The associated wavelength is referred to as the central wavelength $\lambda_0$.

The central operating frequency $f_0$ is 1575 MHz for the first example.

The antenna 10 includes an antenna array 12, the antenna array 12 being herein, as will subsequently be explained, an array of nested antennas.

Furthermore, the antenna 10 is a planar antenna for which a first longitudinal direction corresponding to an axis X (height of the sheet on which FIG. 1 is shown) can be defined and the second strand 18A extends along a second longitudinal direction corresponding to an axis Y (width of the sheet on which FIG. 1 is shown).

In the example shown in FIG. 1, the antenna array 12 is formed by four elementary dipole antennas, simply named dipoles 14 hereinafter.

Each dipole 14 has an L-shaped structure.

As can be seen in FIG. 1, each dipole 14 has an access point 15 and two strands 16 and 18.

The access point 15 is a contact positioned in the center of the dipole 14 and connected to one end of the two strands 16 and 18.

It can be noted that the 15 access points form a square.

The two strands 16 and 18 preferentially have the same length, the length advantageously being less than or equal to $\lambda_0/4$, so that each dipole 14 is a half-wave element.

Furthermore, the angle between each strand 16 and 18 is equal to 90°.

A general L-shape is thus obtained.

Furthermore, each strand 16 and 18 is connected to an access point 15 which is connected either to a source or to a load.

More precisely, a dipole 14 is supplied at the center thereof by a radio frequency source suitable for generating a wave at the operating frequency $f_0$.

Hereinafter, the corresponding dipole 14 is called "powered dipole 14A".

In the example shown in FIG. 1, the first strand of the powered dipole 14A is denoted as first strand 16A and the second strand of the powered dipole 14A is denoted as second strand 18A.

The first strand 16A extends along the first longitudinal direction X and the second strand 18A extends along the second direction Y.

In general, the first strand 16 of a dipole 14 is closer to the inside of the antenna than the second strand 18. The first strand 16 could thus be called "inner strand" whereas the second strand 18 could thus be called "outer strand". The inside and the outside are defined herein in relation to the square formed by the access points: the closer an element is to the center of the square, the more the center is inside.

Thus, depending on the case, the first strand 16 of a dipole 14 extends either along the first longitudinal direction X or along the second longitudinal direction Y, the second strand 18 extending along the other direction.

The other dipoles 14 include a center corresponding to an access point connected to a respective complex load Z. The respective load can be a resistive, a capacitive and/or an inductive load. Each of the strands 16 and 18 of the dipoles 14 has an end which is connected to the access point 15 of the dipole 14 to which the strand 16 and 18 belongs, thus allowing each strand 16 and 18 to be connected to the load specific to the dipole 14 considered.

Hereinafter, each of the corresponding dipoles is called "coupled dipole 14C".

In such a case, the antenna 10 shown in FIG. 1 includes a powered dipole 14A and three coupled dipoles 14C.

Thereafter, the coupled dipoles 14C are ordered (first 14C1, second 14C2 and third 14C3, respectively) according to a counterclockwise order. The reference signs of the strands 16 and 18 of a coupled dipole 14C have the same suffix as the coupled dipole 14C to which the strands belong. Thus, the first strand of the first coupled dipole 14C1 has the reference sign 16C1 and the second strand of the first coupled dipole 14C1 has the reference sign 18C1.

The dipoles 14 are arranged moreover in a specific manner, so as to allow a coupling therebetween.

More precisely, as indicated above, in the case of FIG. 1, the access points 15 form a square.

Moreover, each first strand 16 of a dipole 14 is parallel to a second strand 18 of another dipole 14.

Thus, the first strand 16A of the powered dipole 14A is inside and parallel to the second strand 18C1 of the first coupled dipole 14C1 whereas the second strand 18A of the powered dipole 14A is outside and parallel to the first strand 16C3 of the third coupled dipole 14C3.

The first strand 16C1 of the first coupled dipole 14C1 is outside and parallel to the second strand 18C2 of the second coupled dipole 14C2 whereas the second strand 18C1 of the first coupled dipole 14C1 is outside and parallel to the first strand 16A of the powered dipole 14A.

The first strand 16C2 of the second coupled dipole 14C2 is inside and parallel to the second strand 18C3 of the third coupled dipole 14C3 whereas the second strand 18C2 of the second coupled dipole 14C2 is outside and parallel to the first strand 16C1 of the first coupled dipole 14C1.

The first strand 16C3 of the third coupled dipole 14C3 is inside and parallel to the second strand 18A of the powered dipole 14A whereas the second strand 18C3 of the third coupled dipole 14C3 is outside and parallel to the first strand 16C2 of the second coupled dipole 14C2.

Such arrangement allows the dipoles 14 to be interlaced, allowing the dipoles 14 to couple with each other due to the proximity thereof and because some strands 16 and 18 are collinear with each other.

In fact, in such arrangement, the distance between two points of two collinear strands 16 and 18 is relatively small for good coupling.

As an example, the distance between two collinear strands 16 and 18 is less than or equal to $\lambda_0/10$.

Preferentially, the distance between two collinear strands 16 and 18 is less than or equal to $\lambda_0/20$.

The interleaving of the dipoles 14 can be further used for a miniaturization of the antenna 10 since the antenna 10 has a width and a length on the order of $\lambda_0/4$.

In the present case, the antenna 10 has a width and a length of 5 cm.

In the case shown in FIG. 1, the powered dipole 14A is connected to the GPS reception system.

The first coupled dipole 14C1 is connected to a first capacitive load Z1 of 2.2 pF, the second coupled dipole 14C2 is connected to a second inductive load Z2 of 11.7 nH and the third coupled dipole 14C3 to a third inductive load Z3 of 0.7 nH.

In order to physically produce such an antenna 10, the antenna is etched on a printed circuit onto which the components used for charging the coupled dipoles can be soldered. The antenna 10 is connected to the reception system e.g. through a microwave coaxial cable.

In such a case, the impedance values of the loads Z1, Z2 and Z3 have been adapted so as to obtain circularly polarized radiation.

More precisely, the impedance values of the loads Z1, Z2 and Z3 are chosen so that the radiation satisfies a plurality of conditions, namely:

- a first condition according to which the radiation has a right circular polarization (such a polarization is often called RHCP, an abbreviation for "right-handed circular polarization") with a maximum gain along the zenith direction (corresponds to a direction Z perpendicular to the two longitudinal directions X and Y),
- a second condition according to which the radiation has a relatively uniform RHCP gain for an elevation aperture of +/−90° around said direction (covering the sky, upper half-sphere), and
- a third condition according to which the gain of the cross polarization (i.e. the gain of the left polarization or LHCP, abbreviation for "left-handed circular polarization") is minimized.

Satisfying such conditions makes it possible to make the antenna 10 suitable for an application to a satellite positioning system. Such a positioning system is a system often referred to as GNSS. The abbreviation GNSS is the abbreviation for "global navigation satellite system".

In order to determine appropriate load values Z1, Z2 and Z3, a determination technique e.g. as described in U.S. Pat. No. 9,917,376 B2 can be used by resorting to a decomposition of the desired radiation on a spherical basis, an expression of the electromagnetic field generated by the antenna on the same basis, and a resolution of the equation resulting from the fact that it is desired that the two are identical.

It should be noted that the determination technique is all the easier to implement as the strands 16 and 18 are arranged to form a symmetrical dipole 14.

From a hardware point of view, the loads Z1, Z2 and Z3 can be physical components.

Preferentially, in order to reduce the losses associated with the discrete component packaging, the loads Z1, Z2 and Z3 are produced by etching specific patterns. A spiral or an interdigitated capacitor are examples of such patterns.

As shown schematically in FIG. 2, the antenna 10 is placed above a reflective metal ground plane 20 with a side length of 25 cm in order to direct the radiation into the upper half-space.

According to the example described, the distance between the antenna 10 and the ground plane 20 is 25 mm, i.e. one eighth of a central wavelength $\lambda_0$, so as to constructively reflect the radiation from the antenna along the direction of interest. Such an effect is obtained as soon as the distance between the antenna 10 and the ground plane 20 is less than a quarter of the central wavelength $\lambda_0$.

In a variant, instead of the ground plane 20, an artificial magnetic conductor is used. Such an element is often referred to by the abbreviation AMC (artificial magnetic conductor). In such a case, the distance from the antenna 10 can be even smaller, which reduces the overall height.

The performance of the antenna 10 described hereinabove are illustrated by the FIGS. 3 and 4.

FIG. 3 illustrates the gain diagram obtained at 1575 MHz along a first section plane orthogonal to the first longitudinal direction X (shown with dotted lines) and along a second section plane orthogonal to the second longitudinal direction Y (shown with dot-dash lines). Moreover, the curves for the RHCP gain appear are shown with thicker line than the curves for the LHCP gain.

The observation of the gain diagram shows that the RHCP gain is optimized over the upper half-space and that the LHCP gain is minimized, which indeed corresponds to the desired conditions.

FIG. 4 shows the radiation properties along the zenith direction by representing the gain of the antenna 10 as a function of frequency.

In said curve, the first solid line curve is the gain LHCP expressed in dBic, the second solid line curve is the gain RHCP expressed in dBic and the third dashed line curve corresponds to the axial ratio expressed in dB.

The axial ratio can be used for measuring the polarization purity of the wave emitted by the antenna 10. The axial ratio is the ratio between the major axis and the minor axis which form the ellipse describing the path of the wave. When the long and short axes of the ellipse are equal, the ratio is equal to 1, or 0 dB. In such case, the polarization of the wave is called circular. In practice, a wave is considered to be circularly polarized when the axial ratio is less than 3 dB.

The FIG. 4 shows that the RHCP gain at the desired frequency of 1575 MHz is enhanced, the LHCP gain having a minimum at 1575 MHz.

The analysis of the third curve shows that the axial ratio remains below 3 dB, which confirms a good purity of circular polarization at the desired frequency.

In the first example, the radiation of the antenna 10 is optimized without using a complex and expensive excitation circuit, due to the implementation of load components Z1, Z2 and Z3 with optimized values on the coupled dipoles 14C.

Furthermore, the antenna 10 can be printed on a flat substrate, reducing the bulk and facilitating the integration into any system.

It can be noted that such arrangement has the advantage of operating on different frequency bands by means of a geometrical homothetic transformation and a recalculation of the loads.

EXAMPLE 2: ANTENNA FOR THE BANDS L1 AND L2

The antenna 10 according to the second example is shown schematically in FIG. 5.

The antenna 10 has two antenna arrays 12_1 and 12_2.

The first antenna array 12_1 has a shape similar to the antenna array 12 shown in FIG. 1.

However, same is dimensioned for operating on the frequency band L2 and more specifically around the 1225 MHz central frequency.

In such case, the first coupled dipole 14C1 is connected to a first capacitive load Z1 of 0.5 pF, the second coupled dipole 14C2 is connected to a second resistive load Z2 of 1 MΩ and the third coupled dipole 14C3 is connected to a third capacitive load Z3 of 3.3 pF.

The second antenna array 12_2 has the same architecture as the antenna array 12 shown in FIG. 1.

However, the powered dipole 14A is replaced by a coupled dipole 14C, so that the second antenna array 12_2 includes four coupled dipoles 14C.

By referencing the dipoles similar to the case of the first antenna array 12_1 by continuing the numbering, the second antenna array 122 includes:

a fourth coupled dipole 14C4 near the powered dipole 14A which is connected to a fourth capacitive load Z4 of 1.8 pF, a fifth coupled dipole 14C5 near the first coupled dipole 14C1 which is connected to a fifth capacitive load Z5 of 0.5 pF, a sixth coupled dipole 14C6 near the second coupled dipole 14C2 which is connected to a sixth inductive load Z6 of 24 nH, and a seventh coupled dipole 14C7 near the third coupled dipole 14C3 which is connected to a seventh capacitive load Z7 of 22 pF.

In such case, the impedance values of the loads Z1 to Z7 have been chosen so as to obtain circularly polarized radiation in both frequency bands.

More precisely, the values of the impedances of the loads Z1 to Z7 are chosen so that the radiation satisfies the same three conditions as for the first example, but for the two frequency bands L1 and L2.

From a practical point of view, the dimensions of the antenna 10 are 8 cm by 8 cm. The antenna 10 is printed by lithography (copper etching on dielectric substrate)

FIG. 6 shows two curves, a first curve C1 with solid line representing the evolution with frequency of the gain of the antenna for a right circular polarization along the direction of the zenith (along the Z axis) and a second curve C2 with dotted line illustrating the variation of the axial ratio with the frequency.

It appears that the gain is well optimized for the two aforementioned frequencies of 1225 MHz and 1575 MHz.

Figure 6:
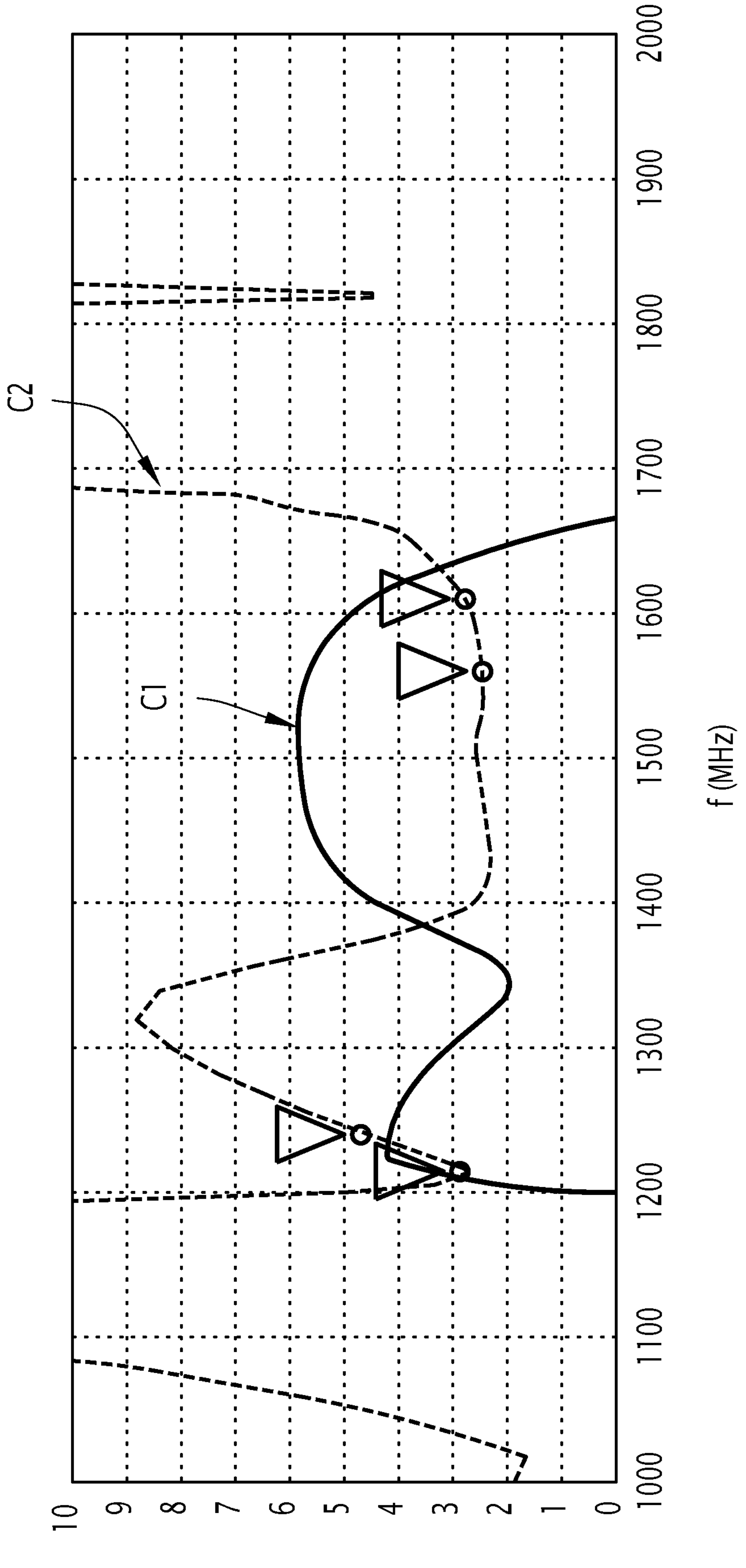
FIGS. 6 to 8 show the performance obtained with the antenna 10 according to the second example.

With the second curve C2 of FIG. 6, it can also be seen that the axial ratio is minimized on the bands L1 and L2. Satellite signals are received in this way at different frequencies used to improve the precision of geolocation by signal processing.

Figure 7:
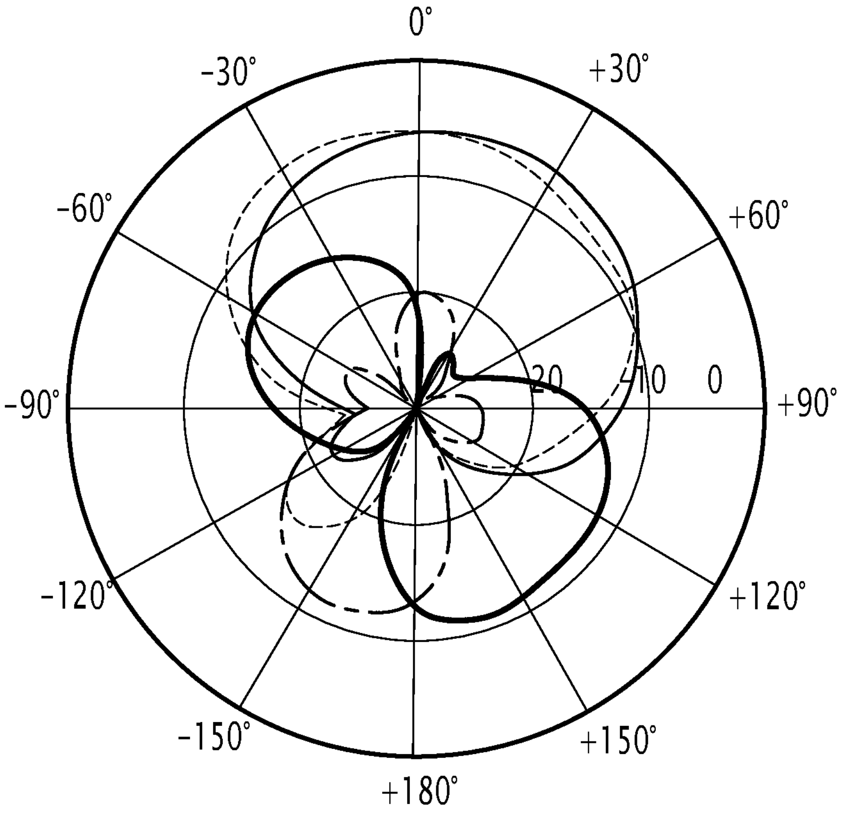
Figure 8:
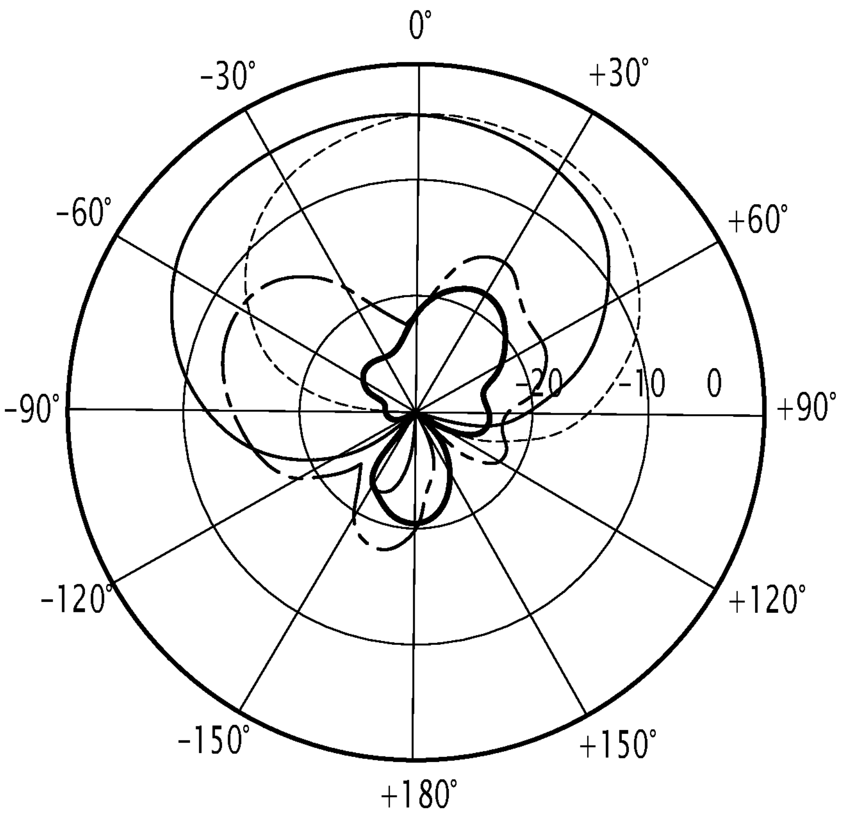

FIGS. 7 and 8 show the radiation patterns in two different cross-sectional planes, for each polarization. FIG. 7 corresponds to the frequency of 1225 MHz (band L2) whereas FIG. 8 corresponds to the frequency of 1575 MHz (band L1).

In each case, it is observed that the RHCP gain in the upper half-sphere is enhanced and that the LHCP gain is minimized.

The adapted optimization of the Z1 to Z7 loads associated with the double L-shaped dipole array 12_1 and 12_2 can be used jointly to obtain radiation on 2 frequency bands, as per the requirements of a GNSS system and without the need for a complex excitation circuit (herein there is only one antenna access port). Such simplicity favors reducing the bulk and reduces manufacturing costs.

Generalization

Figure 9:
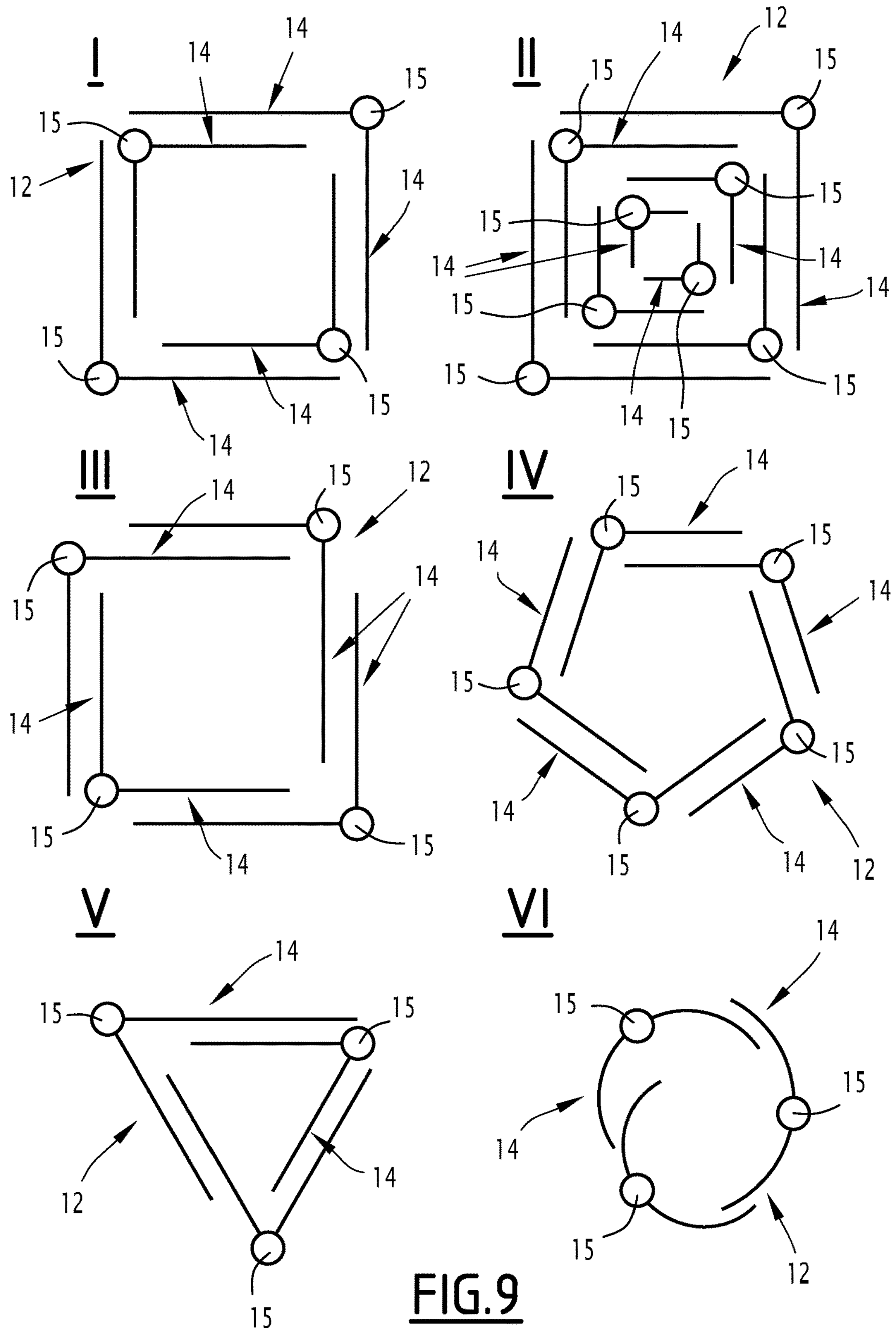

FIG. 9 schematically shows that the dipoles 14 may be arranged differently than what was discussed herein above for a coupling therebetween.

The arrangements have been shown in a simplified manner in said figure in order to well understand the concept.

More precisely, six different arrangements are shown in the Figure, numbered in Roman numerals from I to VI.

Figure 1:
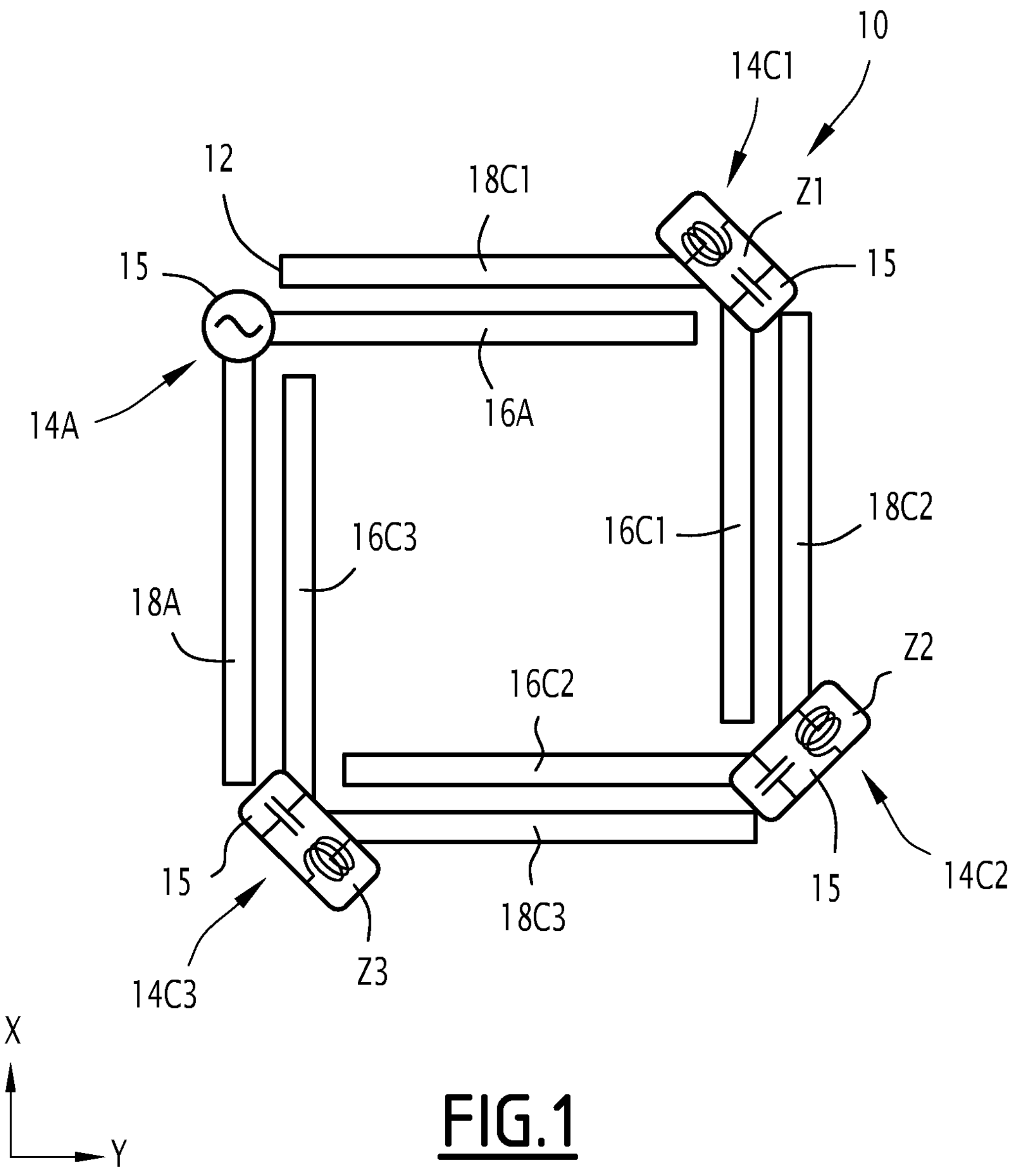
Figure 2:
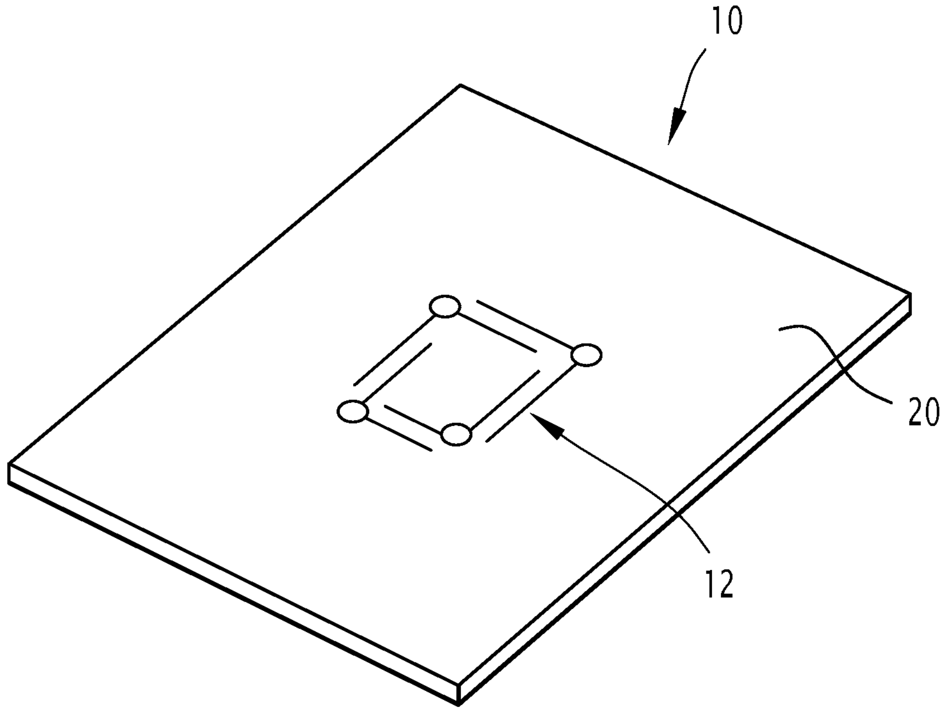
Figure 3:
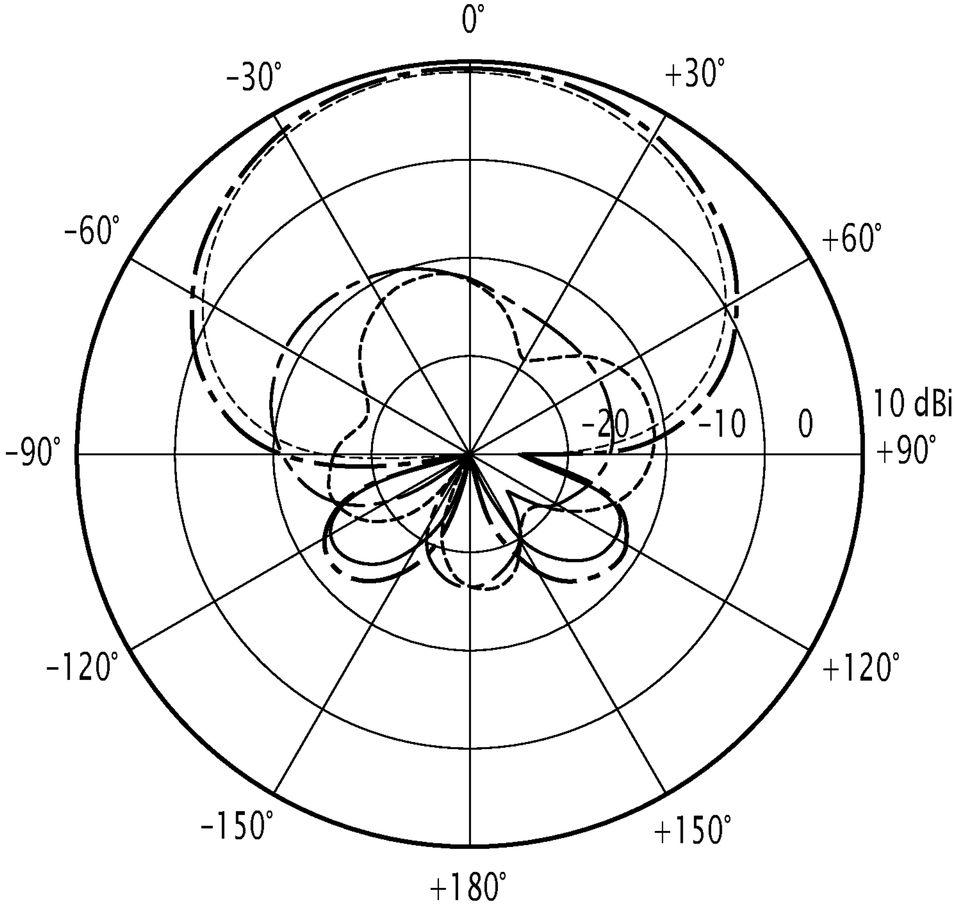
Figure 4:
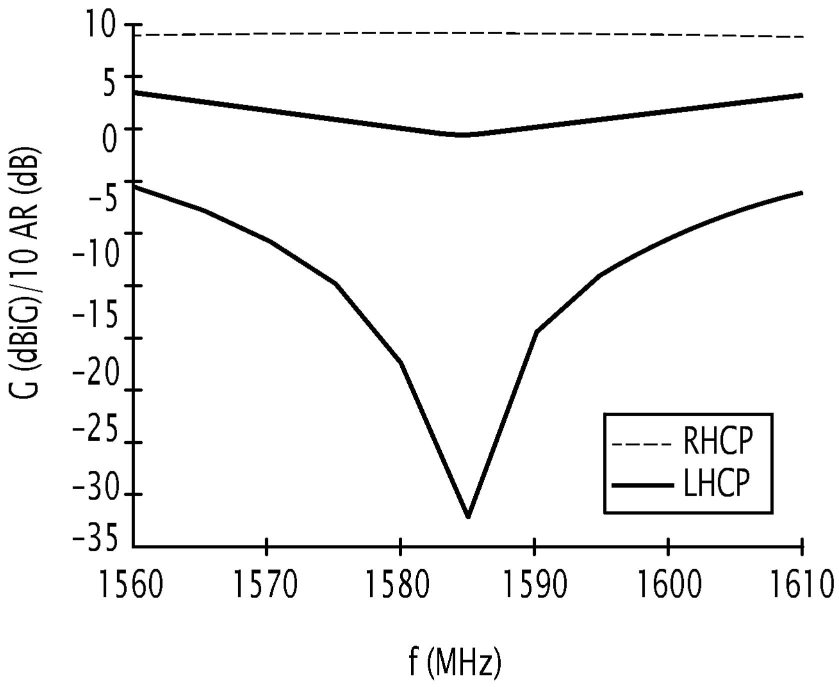
Figure 5:
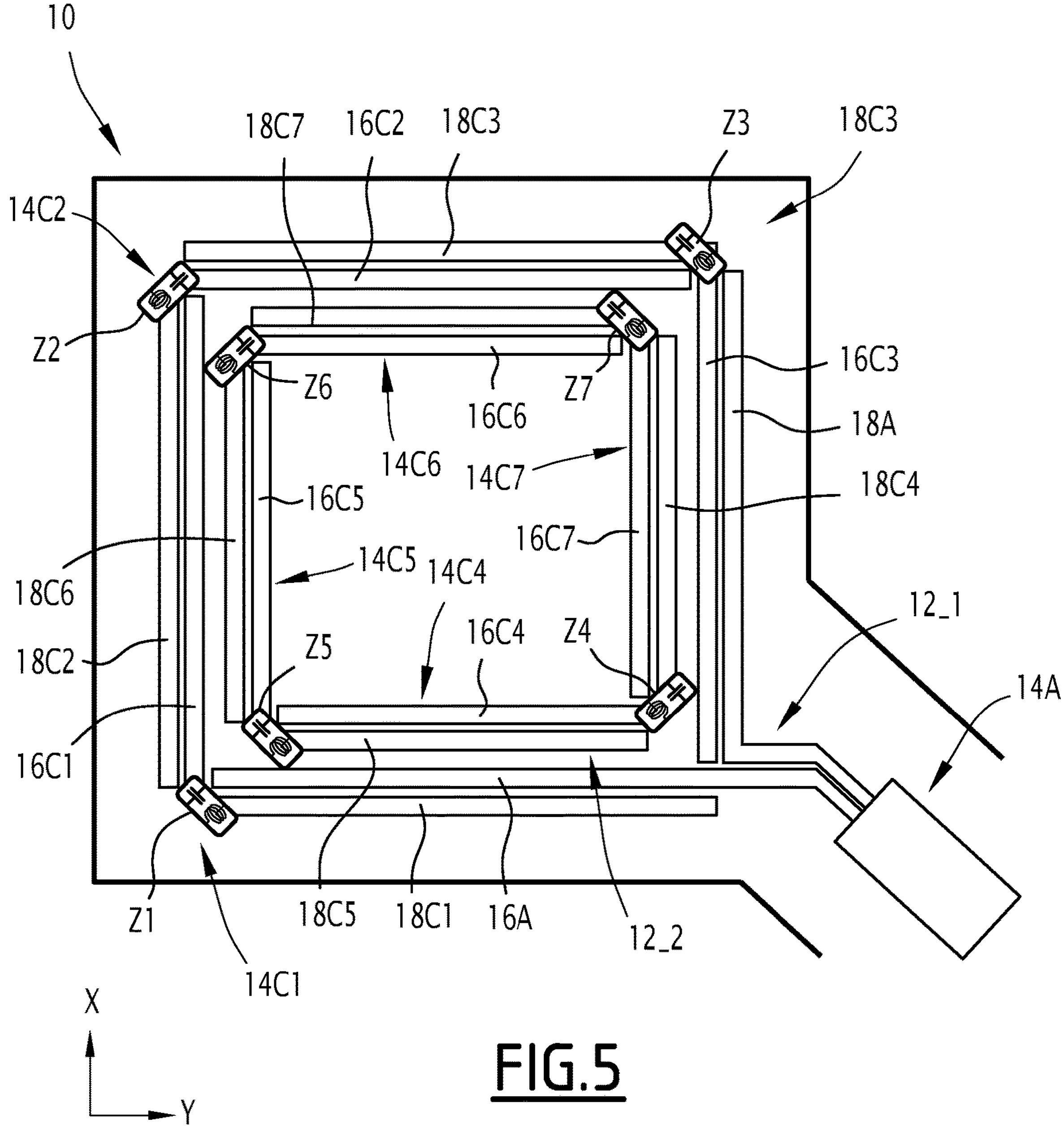

The first arrangement I corresponds to the arrangement shown in FIG. 1 whereas the second arrangement II corresponds to the arrangement shown in FIG. 5. Such arrangements are only repeated in order to facilitate comparison with arrangements III to VI.

The third arrangement III proposes moving the access points 15 away so that the access points 15 no longer form a square, but a rectangle. In such a case, the powered dipole 14A and the first coupled dipole 14C1 have been separated in the second transverse direction Y from the second and third coupled dipoles 14C2 and 14C3.

In the example of the fourth arrangement IV, a fourth coupled dipole 14C is added so that the access points 15 form a regular pentagon.

In the example of the fifth arrangement V, the third coupled dipole 14C3 is removed so that the access points 15 form an equilateral triangle.

The sixth arrangement VI corresponds to the same case as that of arrangement V except that the strands 16 and 18 are no longer rectilinear, but curvilinear. More generally, it is possible to envisage any shape for the strands 16 and 18, in particular with meanders or folds, provided that the neighboring strands 16 and 18 are sufficiently close to provide coupling.

Thus, in each of the arrangements shown in FIG. 9, the access points 15 are arranged to form a polygon, the first strand 16 of a dipole 14 extending along the second strand 18 of a neighboring dipole 14 on the polygon at a distance less than or equal to one tenth of the operating wavelength. In such case, the distance is defined as the minimum distance between two points of the two strands 16 and 18.

By the expression "polygon", it should be understood here a non-flat polygon. This means that each coupled dipole 14C is arranged so that each direction of one strand intersects a direction of another strand.

In this way it is possible to obtain an antenna 10 apt to emit circularly polarized radio frequency waves and having a reduced bulk. Depending on particular cases, the polarization of the antenna 10 is an RHCP or LHCP polarization.

Thus, such an antenna is particularly suitable for multiple applications amongst which satellite positioning systems, whatever the nature thereof, digital satellite radio, communications with microsatellites in low orbit, RFID readers, radars or communication systems between vehicles.

It is also possible to envisage variants with a smaller number of dipoles 14 in the antenna array 12.

In particular, it is possible to consider a variant with two dipoles, a powered dipole and a coupled dipole.

In this way it is possible to further reduce the bulk.

Figure 10:
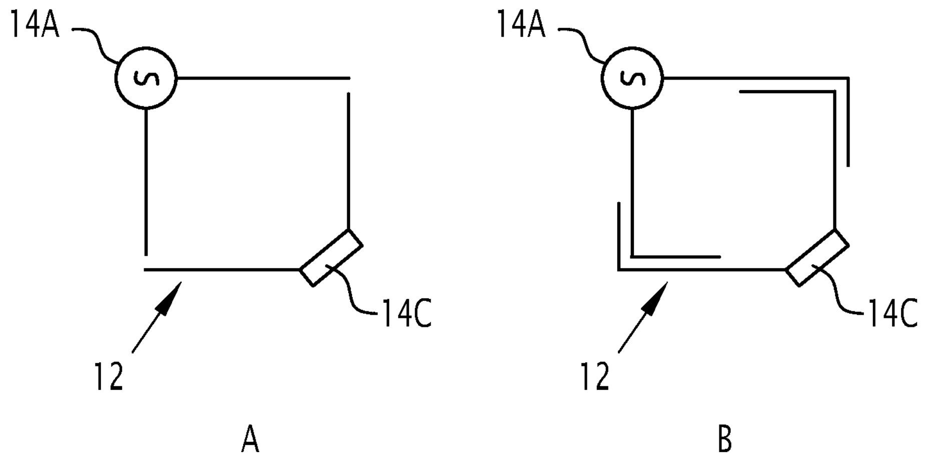

Two examples of embodiments (A and B) are given in FIG. 10.

In both cases, the strands of the dipoles 14 forms substantially a square.

According to the example of embodiment A, the strands of the dipoles 14 are straight.

By contrast, in the example of embodiment B, the strands of the dipoles 14 form a bend.

More precisely, the strands comprises a first part and a second part, both parts being orthogonal and linked together.

The first parts are arranged similarly to the case of the strands of the dipoles 14 of the embodiment A. The second parts are arranged so that the strands fold towards the other dipole.

Furthermore, the second parts are shorter than the first parts. Typically, the length of a second part is inferior to half the length of a first part.

According to a particular embodiment, the number of dipoles 14 in the antenna array 12 is higher, e.g. more than 5.

In this way, better quality circular polarization can be generated and more frequency bands can be addressed.

According to one embodiment, such performance is further improved by a symmetrical antenna pattern, i.e. the dipoles 14 are arranged symmetrically with respect to an axis and the lines producing the feed are parallel to said axis, as is the case for the arrangement shown in FIG. 5 where the axis corresponds to a direction at 45°.

As explained hereinabove, it is possible to print the patterns on a rigid or flexible dielectric material, which facilitates the implementation of the antennas.

It can even be considered to print the antennas directly on the system equipped with the antenna.

Finally, in all the preceding embodiments, the antenna 10 is described as operating in transmission mode, yet the reader will understand that the arrangement of the antenna 10 can also be used for an antenna operating in reception mode.

For this purpose, it is sufficient to connect the powered dipole 14A to a receiver suitable for receiving a wave at the operating frequency $f_0$ instead of connecting the dipole to a source suitable for generating a wave at the operating frequency $f_0$.

Thus, in the general case, a powered dipole 14A is connected at an access point 15 to a radio frequency transmitter suitable for generating or receiving a wave at the operating frequency $f_0$.

The invention claimed is:

1. A radio frequency antenna including at least one antenna array operating at an operating frequency, each antenna array comprising:

a powered dipole, the powered dipole being connected at an access point to a radio frequency transmitter adapted to generate or receive a wave at the operating frequency, at least one coupled dipole, each coupled dipole being connected in an access point to a respective load which is resistive and/or capacitive and/or inductive, the powered dipole and each coupled dipole having two strands, the strands extending from the access point, the access points being arranged to form a polygon, a direction being defined for each strand, the powered dipole and each coupled dipole being arranged so that each direction of one strand intersects a direction of another strand, the first strand of a dipole extending along the second strand of a neighboring dipole on said polygon at a distance less than or equal to one tenth of the wavelength corresponding to the operating frequency, said wavelength being called operating length.

2. The radio frequency antenna according to claim 1, wherein the two strands have a length less than or equal to a quarter of the operating wavelength.

3. The radio frequency antenna according to claim 1, wherein the first strand of a dipole extends along the second strand of a neighboring dipole on said polygon at a distance less than or equal to one twentieth of the operating wavelength.

4. The radio frequency antenna according to claim 1, wherein the directions of the two strands of the same dipole have an angle therebetween equal to 90° within plus or minus 10%.

5. The radio frequency antenna according to claim 1, wherein the polygon is a regular polygon.

6. The radio frequency antenna according to claim 1, wherein the number of coupled dipoles of an antenna array is between 2 and 4.

7. The radio frequency antenna according to claim 1, wherein the radio frequency antenna includes first and second antenna arrays, the polygon formed by the access points of the second antenna array being included in the internal space delimited by the polygon formed by the access points of the first antenna array, each antenna array operating at a respective operating frequency.

8. A radio frequency antenna according to claim 1, wherein the radio frequency antenna has a reflector plane located at a distance less than or equal to one quarter of the operating wavelength.

9. A radio frequency antenna according to claim 1, wherein the strands have meanders or folds.

10. A radio frequency antenna according to claim 1, wherein the loads of the coupled dipoles are chosen so that:

the radiation from the radio frequency antenna has a right circular polarization with a maximum gain along the direction perpendicular to the radio frequency antenna, the radiation from the radio frequency antenna has a uniform right circular polarization for an elevation aperture between 90° and −90° around the direction perpendicular to the radio frequency antenna, and the gain of the cross polarization is minimized.

11. A system including at least one radio frequency antenna according to claim 1.

12. A system according to claim 11, where the system is a satellite positioning system.

* * * * *